United States Patent
Hooper et al.

(10) Patent No.: US 10,406,982 B2
(45) Date of Patent: Sep. 10, 2019

(54) BOTTOM MOUNT BUTTONS FOR A REARVIEW ASSEMBLY

(71) Applicant: Gentex Corporation, Zeeland, MI (US)

(72) Inventors: Kristi L. Hooper, Grandville, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 1181 days.

(21) Appl. No.: 14/490,979

(22) Filed: Sep. 19, 2014

(65) Prior Publication Data

US 2015/0085391 A1    Mar. 26, 2015

Related U.S. Application Data

(60) Provisional application No. 61/880,602, filed on Sep. 20, 2013.

(51) Int. Cl.
*B60R 1/02* (2006.01)
*H01H 13/7065* (2006.01)
*G02B 7/182* (2006.01)
*H01H 13/80* (2006.01)
*H01H 13/83* (2006.01)
(Continued)

(52) U.S. Cl.
CPC .......... *B60R 1/02* (2013.01); *B60R 1/04* (2013.01); *B60R 1/1207* (2013.01); *G02B 7/182* (2013.01); *H01H 13/7065* (2013.01); *H01H 13/80* (2013.01); *H01H 13/83* (2013.01); *H01H 2219/036* (2013.01); *H01H 2221/024* (2013.01); *H01H 2221/044* (2013.01); *H01H 2221/058* (2013.01); *H01H 2300/012* (2013.01)

(58) Field of Classification Search
CPC ........... B60R 1/02; B60R 1/04; B60R 1/1207; H01H 13/7065; H01H 13/80; B60Q 1/2661; B60Q 1/2665; G02B 7/182
USPC ......... 359/871; 200/5 A, 5 R, 341, 344, 345, 200/511; 362/494
See application file for complete search history.

(56) References Cited

U.S. PATENT DOCUMENTS 4,476,356 A * 10/1984 Nakayama ........... H01H 25/041
                                                    200/511
4,499,342 A *  2/1985 Nakayama ........... H01H 25/041
                                                    200/5 A
(Continued)

FOREIGN PATENT DOCUMENTS

WO          9428634 A1    12/1994

OTHER PUBLICATIONS

European Patent Office, European Search Report, dated Sep. 5, 2016 (7 pages).
(Continued)

*Primary Examiner* — Ricky D Shafer
(74) *Attorney, Agent, or Firm* — Price Heneveld LLP; Bradley D. Johnson (57) ABSTRACT

A rearview device having a housing defining at least one button opening. A travel guide defines a button engagement interface. The button engagement interface defines a first aperture and a second aperture. A circuit board is in abutting contact with the travel guide. A switch is disposed between the first aperture and the second aperture. At least one button is operably coupled with the button engagement interface. The at least one button is in communication with the switch.

20 Claims, 4 Drawing Sheets

(51) Int. Cl.
*B60R 1/04* (2006.01)
*B60R 1/12* (2006.01)

(56) References Cited

U.S. PATENT DOCUMENTS

| | | | |
|---|---|---|---|
| 5,128,500 A * | 7/1992 | Hirschfeld | B60N 2/0228 200/5 R |
| 5,579,002 A | 11/1996 | Iggulden et al. | |
| 6,091,831 A | 7/2000 | Cho | |
| 6,243,003 B1 * | 6/2001 | DeLine | B60R 1/12 340/425.5 |
| 6,471,362 B1 * | 10/2002 | Carter | B60R 1/12 359/838 |
| 7,230,196 B2 | 6/2007 | Toyama | |
| 7,266,204 B2 * | 9/2007 | Watson | B60R 1/12 340/426.16 |
| 7,527,403 B2 | 5/2009 | Uken | |
| 2004/0011635 A1 | 1/2004 | Adams | |
| 2007/0019426 A1 | 1/2007 | Uken | |
| 2010/0091394 A1 * | 4/2010 | DeWind | B60R 1/12 359/838 |

OTHER PUBLICATIONS

State Intellectual Property Office of the People's Republic of China, Chinese First Office Action, dated Dec. 7, 2016 (12 pages, including partial translation).
Patent Cooperation Treaty, International Searching Authority, International Search Report, Written Opinion of the International Searching Authority and Notification of Transmittal, dated Dec. 4, 2014, 6 Pages.

\* cited by examiner

BOTTOM MOUNT BUTTONS FOR A REARVIEW ASSEMBLY

CROSS-REFERENCE TO RELATED APPLICATION

This application claims the benefit of and priority to U.S. Provisional Patent Application No. 61/880,602, filed on Sep. 20, 2013, entitled "BOTTOM MOUNT BUTTONS WITH THROUGH HOLE IN PRINTED CIRCUIT BOARD," the entire disclosure of which is hereby incorporated herein by reference.

BACKGROUND OF THE DISCLOSURE

The present disclosure generally relates to rearview mirrors for vehicles, and more specifically, a button-type user interface disposed on a rearview mirror.

SUMMARY OF THE PRESENT DISCLOSURE

One aspect of the present disclosure includes a rearview device having a housing defining at least one button opening. A travel guide defines a button engagement interface. The button engagement interface defines a first aperture and a second aperture. A circuit board is in abutting contact with the travel guide. A switch is disposed between the first aperture and the second aperture. At least one button is operably coupled with the button engagement interface. The at least one button is in communication with the switch.

Another aspect of the present disclosure includes a rearview device having a housing. A travel guide defines a button engagement interface. The button engagement interface defines a first aperture and a second aperture. A circuit board is in abutting contact with the travel guide. A switch is disposed between the first aperture and the second aperture. At least one button is operably coupled with the button engagement interface. The at least one button is in communication with the switch.

Yet another aspect of the present disclosure includes a button assembly for a rearview device having an elongate travel guide defining a button engagement interface. The button engagement interface defines a first aperture and a second aperture. A circuit board is proximate to and is disposed behind the travel guide. A switch is disposed between the first aperture and the second aperture. At least one button is operably coupled with the button engagement interface and includes first and second rearwardly-extending engagement tabs that extend through the first and second apertures, respectively. The at least one button is in communication with the switch.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF EMBODIMENTS

Figure 1:
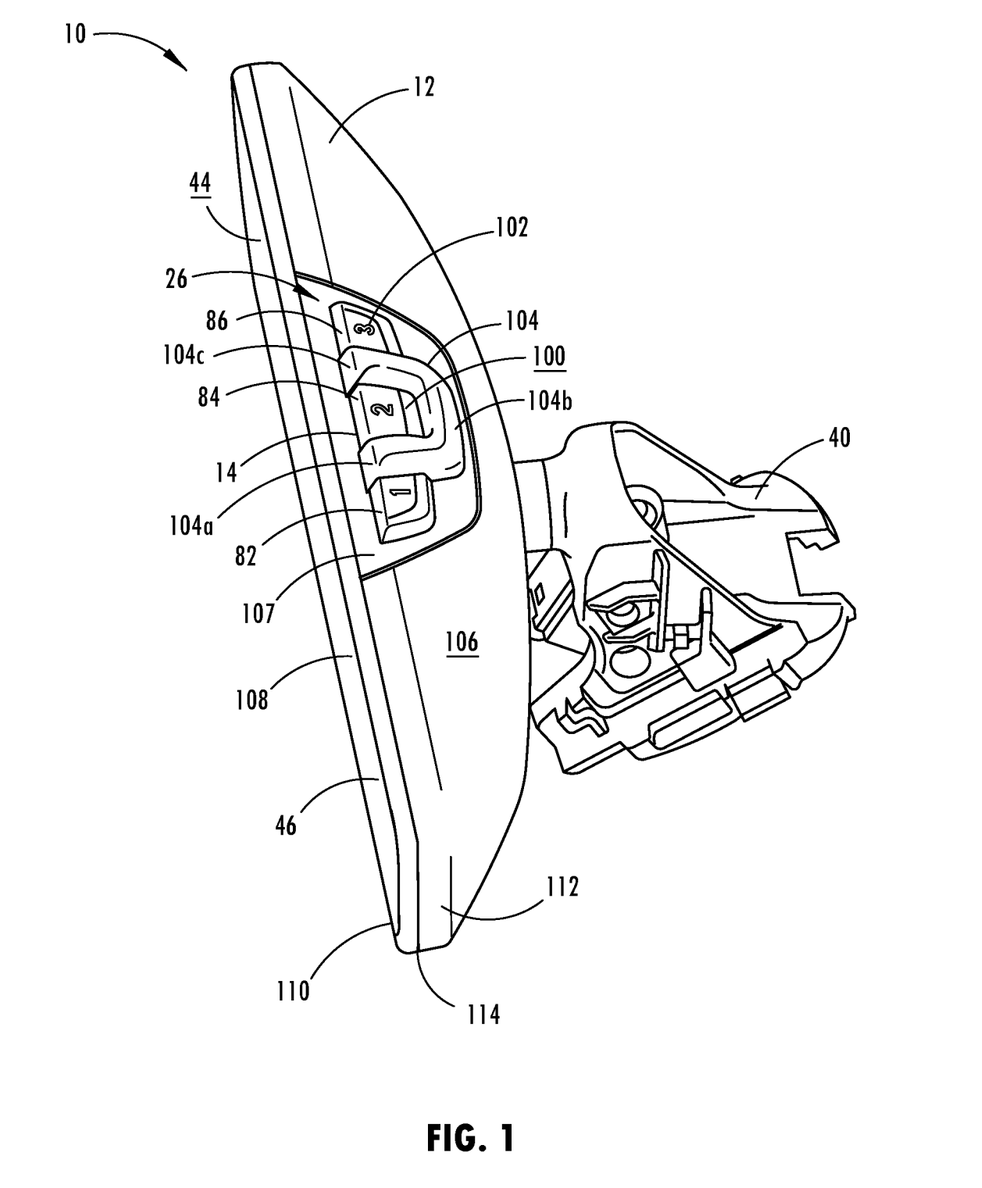
FIG. 1 is a bottom perspective view of one embodiment of the rearview device.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-7, reference numeral 10 generally designates a rearview device 10 including a housing 12 defining at least one button opening 14. A travel guide 16 defines at least one button engagement interface 18. The at least one button engagement interface 18 includes a first aperture 20 and a second aperture 22. A circuit board 28 is disposed in abutting contact with the travel guide 16. A switch 24 is disposed between the first aperture 20 and the second aperture 22. At least one button 26 is operably coupled with the button engagement interface 18. The at least one button 26 is in communication with the switch 24.

Referring again to FIGS. 1 and 2, the rearview device 10 includes a mounting bracket 40 coupled to the housing 12, wherein the mounting bracket 40 is configured to dispose the rearview device 10 onto a portion of the interior of a vehicle, such as a front windshield or a portion of the body of the vehicle proximate the front windshield. The mounting bracket 40 is engaged to the housing 12 by a universal joint 42, such that the user can manipulate the rearview device 10 as desired to provide an aftward view to the driver. A reflective surface 44 is disposed on a front side 46 of the housing 12 to allow the user to receive the aftward view without having to turn around and potentially lose sight of the road.

Referring now to FIGS. 3-7, each of the buttons 26 includes first and second rearwardly-extending engagement tabs 60, 62, wherein the first and second rearwardly-extending engagement tabs 60, 62 extend through the first and second apertures 20, 22 of the button engagement interface 18. Additionally, the travel guide 16 includes a receiving sleeve 64 proximate each of the first and second apertures 20, 22. Each of the receiving sleeves 64 is configured to receive the first and second rearwardly-extending engagement tabs 60, 62. The travel guide 16 also includes one or more retainers 70 that are configured to secure the circuit board 28 in abutting contact with the travel guide 16. The retainers 70 are disposed on a portion of the receiving sleeves 64. It is contemplated that the retainers 70 may be disposed on a different portion of the travel guide 16 distal from the receiving sleeves 64.

Referring again to FIGS. 3-7, as the user engages any one of the buttons 26, and presses the button 26 in an inward direction relative to the travel guide 16, the first and second rearwardly-extending engagement tabs 60, 62 slide linearly through the first and second apertures 20, 22, respectively, of the travel guide 16. Each of the receiving sleeves 64 disposed proximate the first and second apertures 20, 22 are configured to also receive the first and second rearwardly-extending engagement tabs 60, 62 to substantially limit the movement of the buttons 26 in a linear direction, and also substantially prevent rotational movement and wobbling of the buttons 26 during use. When the user depresses one of the buttons 26 a predetermined distance, a rear portion 66 of the button 26 activates the switch 24 disposed on the circuit board 28. As the button 26 is depressed and the switch 24 of the circuit board 28 is moved or activated, the switch 24 is placed in engagement with an electrical contact of the circuit board 28. In various embodiments, the switch 24 can be configured to absorb a portion of the linear movement of the button 26 when the button 26 is depressed. In such an embodiment, only a portion of the force applied to the button 26 is transferred to the circuit board 28. The force transferred to the circuit board 28 by the switch 24 is only of a magnitude that will activate the electrical contact. In this manner, the engagement between the switch 24 and the electrical contact of the circuit board 28 is configured to activate at least one of the various pre-programmed functions of the vehicle, as will be described more fully below, without moving the rearview device 10 from its previous position. It is contemplated that the switch 24, in various embodiments, may be disposed on the circuit board 28. In other embodiments, the switch 24 may include multiple parts that are disposed on both the circuit board 28 and the travel guide 16.

Figure 7:
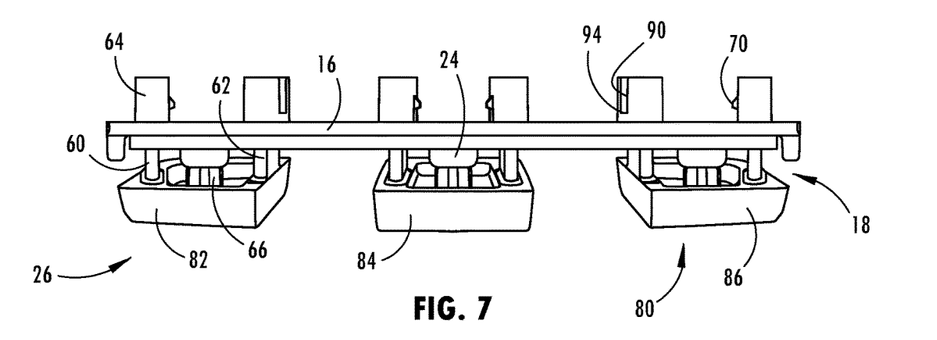
FIG. 7 is a rear elevational view of the button engagement interface of FIG. 3 with the circuit board removed.

Referring now to FIG. 7, a biasing mechanism is disposed proximate each of the buttons 26. The biasing mechanism is configured to bias each of the buttons 26 toward an extended position 80, and is further configured to return the button 26 to the extended position 80 after the user depresses the button 26 to activate the switch 24. The biasing mechanism can be disposed in one of several locations including, but not limited to, an area proximate the switch 24, within one or more of the receiving sleeves 64, or some other location proximate the button 26, the travel guide 16, or both, that is configured to move the button 26 toward the extended position 80. The biasing mechanism can include carbon pucks that make an electrical connection across traces disposed on the circuit board 28 when depressed. The biasing mechanism can be a spring, biasing tabs, elastomer material, or other similar biasing mechanism. In various embodiments, it is contemplated that the switch 24 includes the biasing mechanism.

As illustrated in FIGS. 1-7, the movement of the first and second rearwardly-extending engagement tabs 60, 62 through the first and second apertures 20, 22 at the button engagement interface 18 of the travel guide 16 and into the receiving sleeves 64 allows the user to depress one or more of the buttons 26 to engage the switch 24 such that the button 26 does not come into direct contact with the circuit board 28. In this manner, the button 26 can be depressed without exerting force directly onto the circuit board 28, which may cause unwanted movement of the rearview device 10. In conventional rearview mirrors, when a button 26 is depressed, the button 26 presses directly against the circuit board 28, or an electrical contact of the circuit board 28, contained within the housing 12 of the conventional rearview mirror. As the button 26 engages the circuit board 28, the force of the button 26 being depressed can cause the conventional rearview mirror to move from its previous position, thereby requiring the user to reposition the mirror after depressing one or more of the buttons 26. This unnecessary movement of conventional rearview mirrors can lead to unwanted distractions to the driver of a vehicle due to having to relocate the conventional rearview mirror after depressing one or more of the buttons 26. Conversely, as disclosed above, the movement of the first and second rearwardly-extending engagement tabs 60, 62 through the first and second apertures 20, 22 of the travel guide 16 and into the receiving sleeves 64, along with the direct engagement of the button 26 with the switch 24 rather than the circuit board 28, substantially eliminates excessive force being applied from the button 26 to the circuit board 28, such that the action of depressing the buttons 26 does not substantially move the rearview device 10 of the present application.

Figure 3:
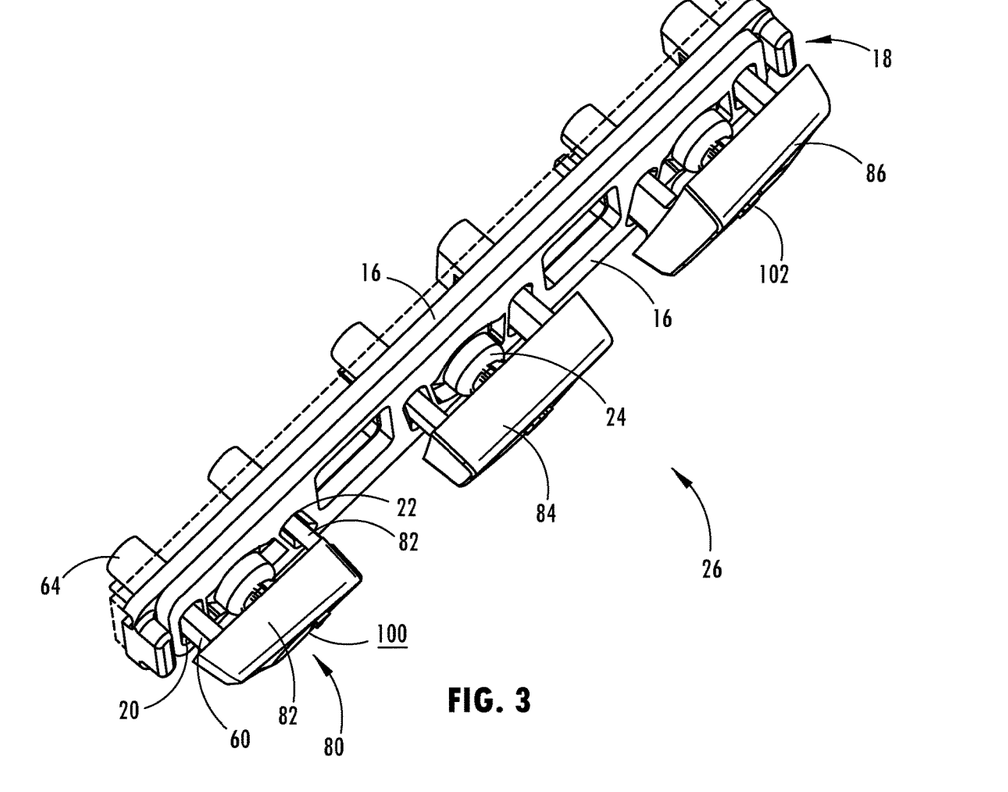
FIG. 3 is a front perspective view of one embodiment of the button engagement interface with the circuit board installed.
Figure 4:
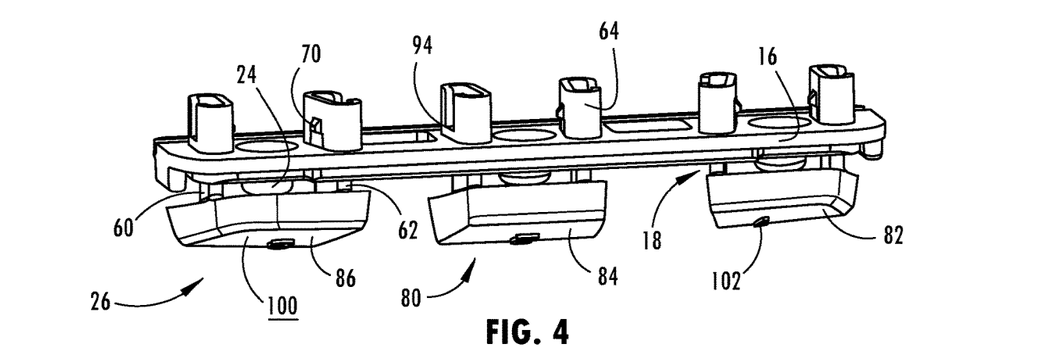
FIG. 4 is a rear elevational view of the button engagement interface of FIG. 3 with the circuit board removed.
Figure 5:
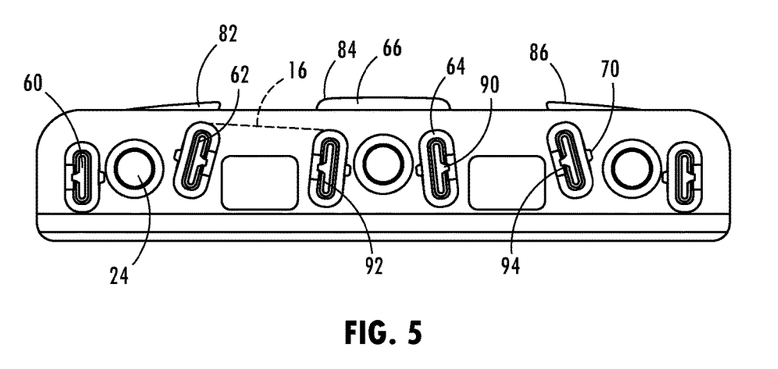
FIG. 5 is a top plan view of the button engagement interface of FIG. 3 with the circuit board removed.

Referring now to FIGS. 3-5, the first and second apertures 20, 22 have an elongate configuration. In such an embodiment, the first and second rearwardly-extending engagement tabs 60, 62 have a cooperatively elongate configuration. The first and second apertures 20, 22, the receiving sleeves 64, and the first and second rearwardly-extending engagement tabs 60, 62 are configured in a non-parallel configuration on the travel guide 16 to accommodate the various features and aspects of the circuit board 28, so as not to interfere with the operation of the circuit board 28 and the pre-programmed functions of the rearview device 10. The non-parallel configuration of the first and second apertures 20, 22 and the first and second rearwardly-extending engagement tabs 60, 62 allows for uniquely configured buttons 26. For example, as illustrated, the uniquely configured buttons 26 include a first button 82, a second button 84, and a third button 86. Notably, the number and size of the buttons 26 can vary depending on the needs of the user. The locations of the first, second, and third buttons 82, 84, 86 are not interchangeable among the various button openings 14. In this manner, unique features of the individual buttons 26 can be designated for a specific position within the rearview device 10. In various alternate embodiments, the apertures, the receiving sleeves 64 and the first and second rearwardly-extending engagement tabs 60, 62 can have an identical configuration within the travel guide 16, where the features and aspects of the circuit board 28 are configured to allow for this identical configuration. In this embodiment, the location of the buttons 26 can be configured as interchangeable, such that a single type of button 26 can be manufactured for placement within any one of the button openings 14 defined within the housing 12 of the rearview device 10. It is also contemplated that the buttons 26 could include additional functionality. For example, the buttons 26 may include audible or haptic feedback to the user to indicate that a button has or has not been selected. Further, the buttons 26 may include lighting members configured to illuminate the buttons 26 or indicia on the buttons 26.

Figure 6:
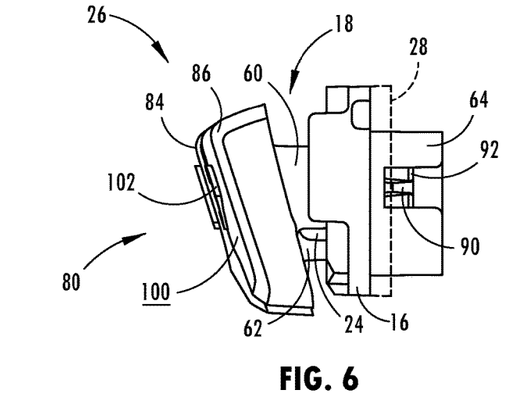
FIG. 6 is a side elevational view of the button engagement interface of FIG. 3 with the circuit board installed.

Referring now to FIGS. 4-6, each of the first and second rearwardly-extending engagement tabs 60, 62 includes a detent 90 at a rearward end 92 thereof. This detent 90 is configured to maintain each of the buttons 26 in secure engagement with the travel guide 16. In the various embodiments, the detent 90 can take the form of a tab, an angled protrusion, or other similar protuberance that cooperatively engages a notch 94 or similar cooperative interference member. In this manner, the detent 90 limits the outward movement of the one or more buttons 26 caused by the biasing mechanism and defines the extended position 80. In various embodiments, the detent 90 can be disposed on the rearwardly-extending engagement tabs, wherein each receiving sleeve 64 includes the notch 94 configured to receive the detent 90. In alternate configurations, the receiving sleeve 64 can include the detent 90 and one of the first and second rearwardly-extending engagement tabs 60, 62, or both, can include the notch 94 configured to receive the detent 90 on the receiving sleeve 64. As generally illustrated in FIG. 6, the planar extent of the first, second, and third buttons 82, 84, 86 may be angled relative to the planar extent of the travel guide 16 and the circuit board 28. The angle of the first, second, and third buttons 82, 84, 86 may vary and can even be substantially parallel with the travel guide 16 and the circuit board 28.

In various embodiments, the engagement of the first and second rearwardly-extending engagement tabs 60, 62 with the receiving sleeves 64 can define a secondary detent 90 that is configured to provide a haptic interface to the user, wherein the haptic interface is substantially sufficient to inform the user that the button 26 has reached a depressed position sufficient to engage the switch 24 of the travel guide 16. In various alternate embodiments, the haptic interface can be defined between the rear portion 66 of the button 26, between the first and second rearwardly-extending engagement tabs 60, 62 and the first and second apertures 20, 22, or at some other engagement between a portion of the button 26 and a portion of the travel guide 16. In further alternate embodiments, the haptic interface can include a mechanical haptic interface that is engaged when the button 26 engages the switch 24 and provides the user with one of various indications that can include, but are not limited to, an auditory signal, a vibration, a visual display, or other similar electrical haptic interface.

Referring again to FIGS. 1-7, the rearview device 10 can include a plurality of buttons 26, wherein the first, second and third buttons 82, 84, 86 can be included. It is contemplated that additional buttons 26 can also be included in the rearview device 10. Each of the buttons 26 of the rearview device 10 is configured to engage the switch 24 of the travel guide 16 for activating distinct pre-programmed functions of the vehicle. These functions can include, but are not limited to, providing status information of the vehicle (fuel economy, ambient temperature, direction of travel, and the like), activating various mechanisms external to the vehicle (garage doors, Bluetooth connections, and the like), control various functions of the vehicle (mirror dimming, activating lights, defrost functions, and the like), as well as other features that may be included in or related to the vehicle.

Referring again to FIGS. 3-7, each of the buttons 26 includes a selection surface 100, wherein the planar or outer extent of the selection surface 100 extends at an acute angle relative to the travel guide 16. This selection surface 100 can have a flat, planar configuration or can be a contoured surface having a concave or convex configuration. Various indicia 102, either visual or tactile, or both, can be disposed on the selection surface 100 of the button 26, to allow the user to identify which button 26 is being depressed without having to look up at the buttons 26 for selection.

Referring again to FIGS. 1 and 2, an indicator light 104 is positioned between the first and second buttons 82, 84 and also between the second and third buttons 84, 86. The indicator light 104 can be configured to illuminate the buttons 26, indicate a security system is active, or to illuminate an area of the vehicle disposed below or adjacent to the rearview device 10. The indicator light 104 includes a generally U-shaped construction, wherein a first portion 104a extends between the first button 82 and the second button 84, a second portion 104b that extends behind the second button 84, and a third portion 104c that extends between the second button 84 and the third button 86.

Figure 2:
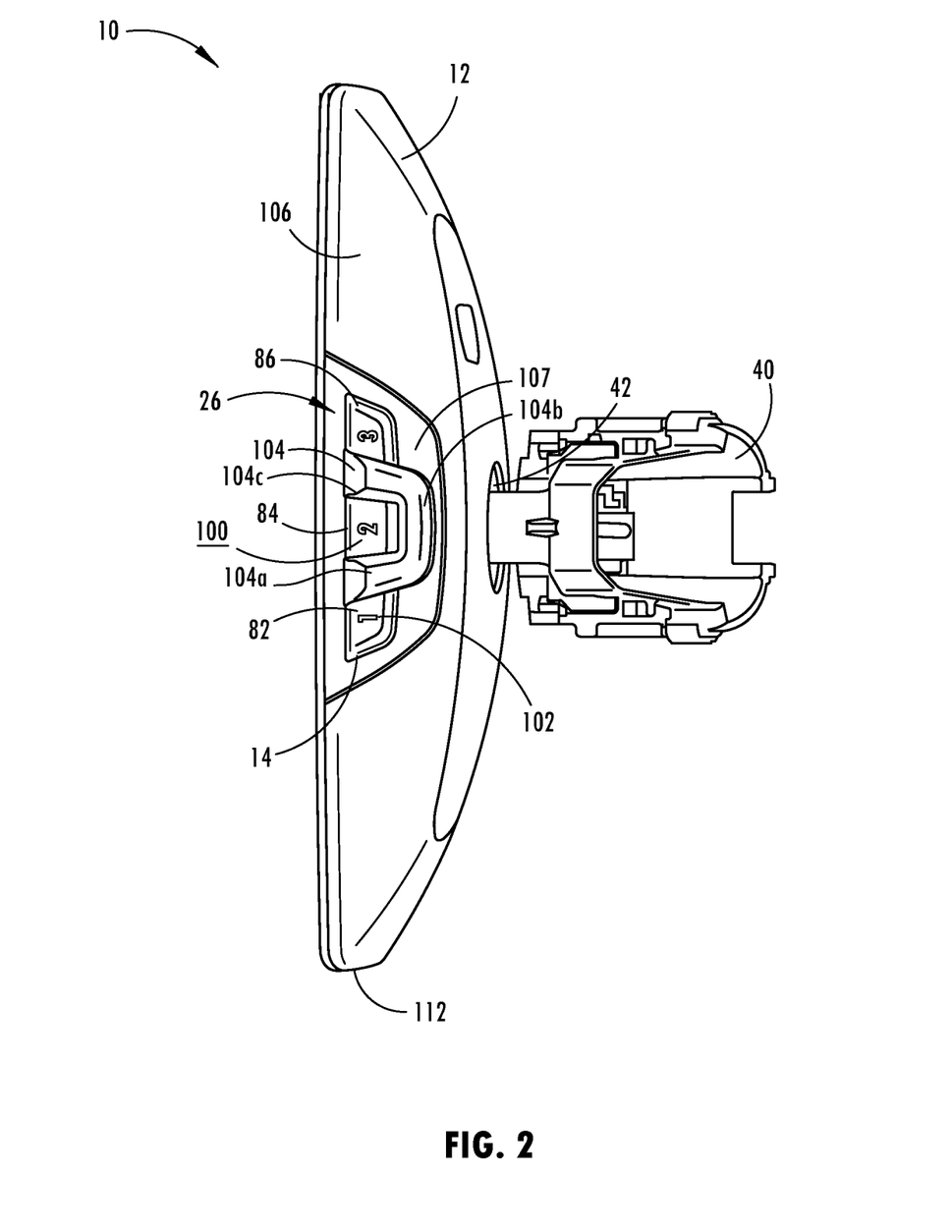
FIG. 2 is a bottom plan view of the rearview device of FIG. 1.

As further illustrated in FIGS. 1 and 2, the buttons 26 of the rearview device 10 are disposed on a bottom surface 106 of the housing 12. In the illustrated embodiment, the first, second, and third buttons 82, 84, 86 are disposed in a bottom cover plate 107, which is incorporated into the housing 12. It is also contemplated that the cover plate 107 could be a separate distinct piece. Further, the first, second, and third buttons 82, 84, 86 could also be positioned directly in the bottom surface 106 of the housing 12. However, the first, second, and third buttons 82, 84, 86 could also be positioned closer to one end or on a top side of the housing 12. In various alternate embodiments, one or more of the buttons 26 can be disposed on a bottom portion 108 of the reflective surface 44. Alternatively, one or more of the buttons 26 may be disposed proximate an outer edge 110 of the reflective surface 44, such that the buttons 26 are located within the boundary of their reflective surface 44, or within the sides 112 or top 114 of the housing 12 proximate the reflective surface 44.

The present invention may be used with a mounting system such as that described in U.S. Pat. Nos. 8,814,373; 8,201,800; and 8,210,695; U.S. Patent Application Publication Nos. 2014/0063630, now U.S. Pat. No. 9,174,577; 2013/0062497, now U.S. Pat. No. 8,925,891; and 2012/0327234, now U.S. Pat. No. 9,838,653; and U.S. Provisional Patent Application Nos. 61/709,716; 61/707,676; and 61/704,869, which are hereby incorporated herein by reference in their entirety. Further, the present invention may be used with a rearview packaging assembly such as that described in U.S. Pat. Nos. 8,814,373; 8,646,924; 8,643,931; and 8,264,761; U.S. Patent Application No. 2013/0194650, now U.S. Pat. No. 8,885,240; and U.S. Provisional Patent Application Nos. 61/707,625; and 61/590,259, which are hereby incorporated herein by reference in their entirety. Additionally, it is contemplated that the present invention can include a bezel such as that described in U.S. Pat. Nos. 8,827,517; 8,210,695; and 8,201,800, which are hereby incorporated herein by reference in their entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview device comprising:
    a housing defining at least one button opening;
    a travel guide defining a button engagement interface, wherein the button engagement interface defines a first aperture and a second aperture;
    a circuit board in abutting contact with the travel guide;
    a switch disposed between the first aperture and the second aperture;
    at least one button operably coupled with the button engagement interface, wherein the at least one button is in communication with the switch.

2. The rearview device of claim 1, wherein the at least one button includes first and second rearwardly-extending engagement tabs.

3. The rearview device of claim 2, wherein the first and second rearwardly-extending engagement tabs extend through the first and second apertures.

4. The rearview device of claim 3, wherein the travel guide includes a receiving sleeve proximate each of the first and second apertures, the receiving sleeve being configured to receive the first and second rearwardly-extending engagement tabs.

5. The rearview device of claim 4, wherein the first and second rearwardly-extending engagement tabs include a detent at a rearward end thereof, and wherein the detent is configured to maintain the at least one button in secure engagement with the travel guide.

6. The rearview device of claim 5, wherein each receiving sleeve includes a notch configured to receive the detent.

7. The rearview device of claim 1, wherein the at least one button includes a first button, a second button, and a third button.

8. The rearview device of claim 7, wherein an indicator light is positioned between the first and second buttons and also between the second and third buttons.

9. The rearview device of claim 1, wherein the first aperture and the second aperture are elongate.

10. The rearview device of claim 1, wherein the at least one button includes a selection surface, and wherein a planar extent of the selection surface extends at an acute angle relative to the travel guide.

11. The rearview device of claim 1, wherein the at least one button is disposed on a bottom of the housing.

12. The rearview device of claim 1, further comprising:
    a reflective surface, wherein the at least one button is disposed on a bottom of the housing proximate the reflective surface.

13. A rearview device comprising:
    a housing;
    a travel guide defining a button engagement interface, wherein the button engagement interface defines a first aperture and a second aperture;
    a circuit board in abutting contact with the travel guide;
    a switch disposed between the first aperture and the second aperture;
    at least one button operably coupled with the button engagement interface, wherein the at least one button is in communication with the switch; and
    an indicator light configured to wrap around at least three sides of the at least one button.

14. The rearview device of claim 13, wherein the at least one button includes a first button, a second button, and a third button.

15. The rearview device of claim 14, wherein the indicator light is positioned between the first and second buttons and also between the second and third buttons.

16. The rearview device of claim 13, wherein the first aperture and the second aperture are elongate.

17. The rearview device of claim 13, wherein the at least one button includes a selection surface, and wherein the planar extent of the selection surface extends at an acute angle relative to the travel guide.

18. The rearview device of claim 13, wherein the at least one button is disposed on a bottom of the housing.

19. A button assembly for a rearview device comprising:
    an elongate travel guide defining a button engagement interface, wherein the button engagement interface defines a first aperture and a second aperture;

a circuit board proximate to and disposed behind the travel guide;

a switch disposed between the first aperture and the second aperture;

at least one button operably coupled with the button engagement interface and including first and second rearwardly-extending engagement tabs that extend through the first and second apertures, respectively, wherein the at least one button is in communication with the switch.

20. The button assembly of claim 19, wherein the at least one button includes a first button, a second button, and a third button, and wherein an indicator light is positioned between the first and second buttons and also between the second and third buttons.

\* \* \* \* \*